May 20, 1958 R. E. ROGERS ET AL 2,835,256
THRESHING FAN
Filed May 9, 1955
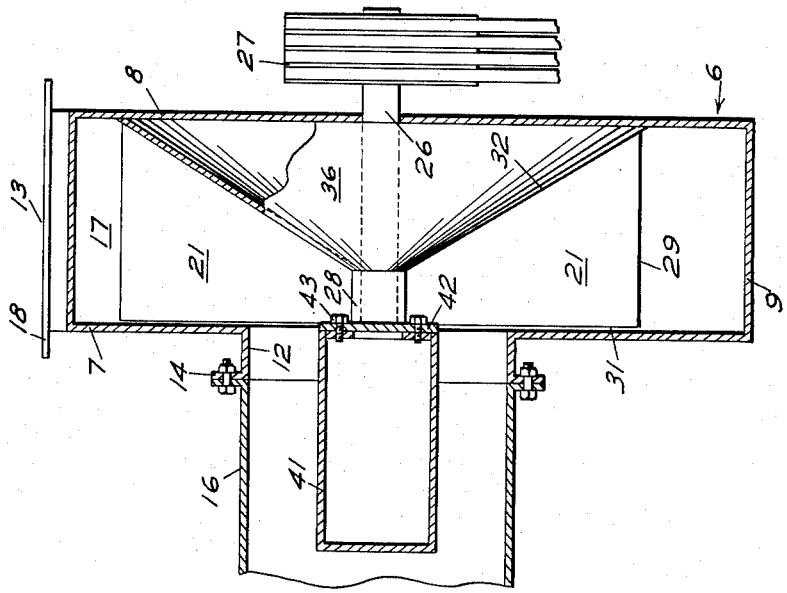
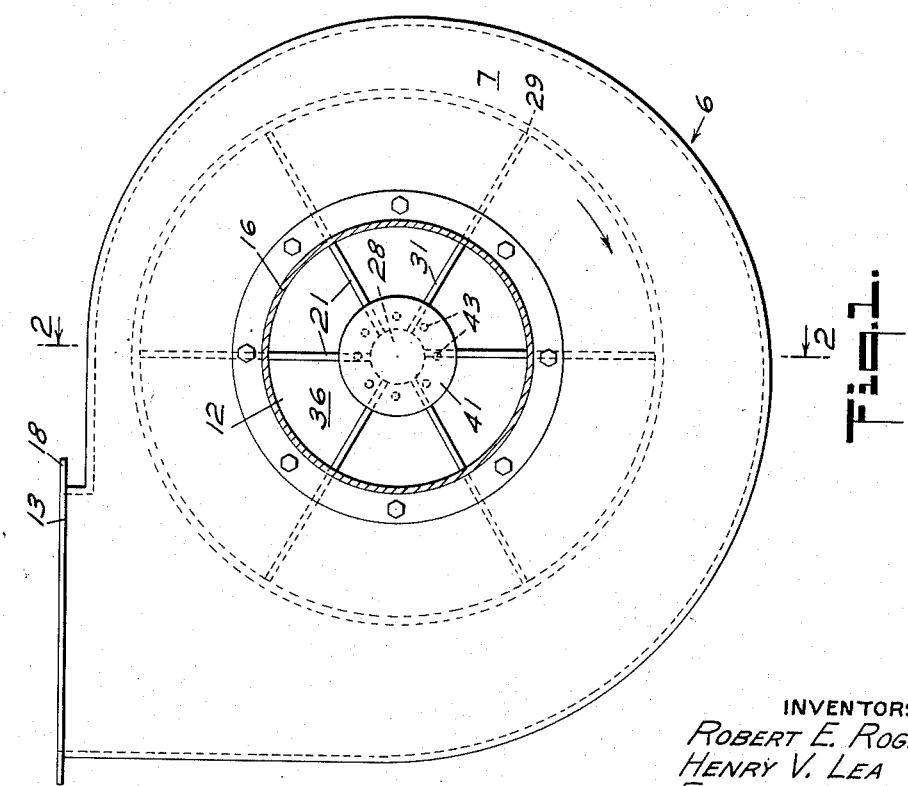
INVENTORS
ROBERT E. ROGERS
HENRY V. LEA &
FREDERICK L. HILL
BY
Gardner & Zimmerman
ATTORNEYS

United States Patent Office 2,835,256
Patented May 20, 1958

2,835,256

THRESHING FAN

Robert E. Rogers, Sausalito, and Henry V. Lea and Frederick L. Hill, Rio Vista, Calif., assignors to Harvestaire, Inc., Oakland, Calif., a corporation of California Application May 9, 1955, Serial No. 507,004

1 Claim. (Cl. 130—27)

This invention relates to material handling apparatus, and is more particularly directed towards a fan adapted to receive a product, thresh the same, and discharge the threshed product in a constantly moving fluid stream.

Heretofore, substantially conventional air fans have been utilized in connection with the moving of material particles in an air stream, and in some installations, such fans were adapted to serve the dual purpose of not only transferring the product from one location to the other, but also to thresh various components of the material. For example, in the handling of certain agricultural products, the fan may be utilized to free the grain or seeds from their associated straw or husks. This permitted the separated material to pass on to other operations for complete segregation of the free products. It is well established that a conventional air fan is primarily adapted for moving high quantities of air, and consequently is not designed for the express purpose of moving material which may be entrained in the air. Obviously, the greater volume of air being moved by the apparatus requires correspondingly greater horse power input requirements, and when the added burden created by moving the material with the air is considered, the power requirements may become excessive. It has likewise been found that in conventional air moving fans, where materials such as lengthy corn stalks, weeds and certain cereal grains are entrained in the air, there is a tendency for the product to jam or become matted over the face of the runner or blades so as to actually completely throttle the operation of the unit, or at least severely decrease the efficiency thereof.

Accordingly, it is an object of the present invention to provide material handling apparatus which is adapted to receive a relatively low volume of air and a relatively high quantity of entrained material and pass the same through the apparatus with minimum power requirements.

Another object of this invention is to provide apparatus of the character described in which the material entrained in the fluid flow will be thoroughly threshed as it passes through the unit.

A further object of the invention is to provide a material handling and threshing unit in which a novel blade construction is utilized whereby a positive pressure is maintained throughout the unit and whereby the veloccity of the fluid passing through the unit is more constant than in conventonal types of equipment of this nature.

A still further and extremely important object of the invention is to provide a threshing fan in which means are provided for positively preventing the jamming of weeds or other material entrained in the air as the air and entrained product passes into and through the threshing chamber.

Yet another object of the invention is to provide apparatus of the character described in which the fan inlet is provided with a rotating unit in axial alignment therewith which provides for a substantially uniform axial movement of the entrained material and carrier fluid into the threshing chamber wherein it is carried around by the threshing blades towards the discharge of the apparatus.

A further object of the invention is to incorporate in a structure of the character described, a blade or runner construction in which the portion of the blade adjacent the inlet is of relatively limited area and the portions of the blade adjacent the outlet have considerable greater area so that less air is picked up and moved by the unit, and eliminates the presence of "dead" areas on the blades.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to said drawing:

Figure 1 is a front elevational view of our new threshing fan.

Figure 2 is a cross-sectional view taken substantially in the plane indicated by line 2—2 of Figure 1.

In broad terms, the apparatus of the present invention includes a fan casing, a plurality of rotatable blades within said casing for delivering material introduced axially into the casing to a tangentially disposed discharge opening. The action of the blades or runners also functions to thresh the material entrained in the fluid carrier. The fan apparatus also incorporates a spinner attachment extending axially from the fan blades into the inlet duct, and as hereinabove described, the purpose of such a spinner is to cause entrained material such as straw or the like to feed axially into the threshing unit without becoming matted over or adjacent the leading edges of the blades.

As illustrated in the drawing, the casing, generally indicated by the numeral 6, is provided with a front end wall 7, a rear end wall 8 and a peripherally extending side wall 9 disposed between the front and rear walls. The casing is of generally convolute form as is conventional with fans of this nature, and is provided with an axially aligned inlet opening 12 and a tangentially directed outlet opening 13, the axis of the latter being normal to the inlet opening. The inlet 12 is provided with a radial flange 14 for connection to an inlet duct 16 through which material is introduced into the casing chamber 17, and the outlet 13 is likewise provided with a flange 18 for connection to a discharge conduit or duct (not shown). For purposes of simplicity in the drawing, the support for the fan casing has not been illustrated, but as such supports are well known in the art and as the same constitutes no part of the present invention no detailed explanation or showing thereof is deemed necessary.

It should also be understood that while the casing is formed of a scroll or convolute design, the fan blades 21 extend radially and equally from the center of the fan inlet 12, the latter being hereinafter referred to as the axis of the unit. With this type of construction, the blade tips are disposed close to the tangential outlet and the wall 9 at one point of their travel, with an increasingly larger space between the blade tips and the wall as the discharge opening is approached. The foregoing is well established design in fan construction.

The rear wall 8 is apertured at the axis thereof for receiving a drive shaft 26, the latter extending to substantially the inlet opening 12. Any suitable sheave 27 or the like may be secured to the drive shaft for rotating the latter and no particular form of drive is considered a part of this invention. The blades 21 extend radially from a solid hub 28 mounted on and secured to the leading end of the drive shaft, and as here illustrated, six blades are provided although other numbers of equally spaced blades could be utilized in the apparatus.

As an important feature of the invention, the blades are of outwardly diverging form and as illustrated in Figure 2 of the drawing, have a minimum width adjacent the hub 28 and a maximum width at their tip edges 29. The leading edges 31 of the blades are substantially straight and disposed in parallel adjacent relationship to the front end wall 7, whereas the trailing edges 32 of the blades extend radially outwardly and rearwardly from the hub. Thus, a generally triangular-shaped blade is provided. While applicants are not fully aware of the reasons for such construction, it has been found that by having the blades of such shape, a high quantity of entrained material in a carrier fluid may be moved through the unit while transporting a minimum quantity of the fluid itself. Also, it has been found that the drive power requirements can be minimized and a uniform and even flow of material through the unit may be effected without creating any dead spots in the chamber 17 or requiring the fluid to be recirculated for more than one complete revolution of the blades.

Disposed substantially immediately rearwardly of the trailing edges 32 of the blades is an imperforate conically shaped member 36, mounted on the rear wall 8 and extending to the hub 28. This conical member is stationary and may be hollow so as to define a dead air space immediately rearwardly of the blades. Thus, air upon entering the inlet 12 first engages a portion of the fan of minimum width and at the minimum blade velocity and as the air and entrained material is hurled outwardly and faster circumferentially in the casing, an increasingly larger blade area is prevented and the material may spread out between the front wall 7 and the rearwardly sloping surface of member 32. This results in the aforesaid desired operating characteristics and optimum efficiency in operation.

It was hereinabove mentioned that in conventional threshing fans there is a strong tendency for weeds or similar material to mat or become entangled on the leading edges of the blades as such material enters the inlet 12 from the conduit 16. One of the reasons for this is that the material in the conduit 16 tends to swirl along the surface of the conduit until it approaches the actual fan inlet. At this time it is common for pieces of the material, instead of continuing along the surface of the conduit and entering the fan inlet longitudinally, to move laterally towards the axial center of the conduit and enter the fan on a cross over type of operation. In other words, material which was engaging the upper portion of the conduit 16 as shown in Figure 2 may likely enter the lower portion of the fan inlet, and conversely the material on the lower portion of the conduit may enter the upper portion of the fan inlet. This cross over often results in a complete jamming of the fan operation. In accordance with the teachings of the present invention, this matting and cross over is effectively prevented by providing an attachment designated by the numeral 41 extending axially forwardly from the threshing blades into the inlet conduit 16. As here illustrated, the attachment is in the form of an enclosed cylindrical spinner rigidly attached to a flange 42 on the hub by means of machine screws 43 or the like. Naturally, this spinner should extend only for the minimum required distance as in many instances, the conduit 16 is not provided with a sufficiently long axial run to permit an extremely long spinner attachment. In practice, we have found that the length of the spinner 41 should be approximately the width of the casing 6 and a diameter of somewhat less than the one-half that of the inlet duct. Shortening the spinner appears to decrease the efficiency thereof and likewise decreasing or increasing the diameter thereof by any substantial amount detracts from its operating characteristics. In any event, a spinner of the type described results in the carrier fluid and entrained material passing through the duct 16 in the direction of the arrows, and then freely entering the fan inlet 12 around the cylindrical spinner along parallel longitudinal paths. The fluid and material is then picked up by the threshing blades for circulation through the chamber 17 and discharged from the outlet 13 of the casing. During the period of travel, the action of the threshing blades in combination with the enclosed housing results in a thorough threshing of the entrained material so as to loosen the grain or seeds from their associated straw or husks. Thus, upon emergence of the fluid and entrained material any suitable separating equipment may be utilized to physically segregate the valuable grain or seeds from the generally worthless straw or husks.

From the foregoing description, both the details of construction and the general operation of our improved material handling apparatus should be understood, and it has been found in practice that a unit constructed as above described will fulfil its requisite duties with less power and greater efficiency than threshing fans heretofore available on the market.

What is claimed is:

Material moving and air threshing apparatus comprising a generally cylindrical casing having a substantially axially aligned inlet opening and a tangentially directed outlet opening disposed normal to said inlet opening, a rotatable fan disposed within said casing and including a plurality of equally spaced radially extending blades, each of said blades having a substantially straight leading edge disposed adjacent said inlet opening and a rear edge converging from the axis of rotation upwardly and outwardly towards the distal end thereof, a generally imperforate conical member fixedly positioned within said casing adjacent the trailing edges of said blades, and a cylindrical element secured to the leading edges of said blades and extending axially forwardly thereof.

References Cited in the file of this patent

UNITED STATES PATENTS

| | | |
|---|---|---|
| 111,026 | Williams | Jan. 17, 1871 |
| 618,361 | Landis | Jan. 24, 1899 |
| 1,627,608 | Keeney | May 10, 1927 |
| 1,834,959 | May | Dec. 8, 1931 |
| 2,616,764 | Parrish | Nov. 4, 1952 |